E. SACHS.
COASTER BRAKE CONNECTOR.
APPLICATION FILED JAN. 24, 1912.
1,045,195.
Patented Nov. 26, 1912.
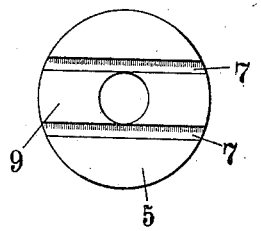
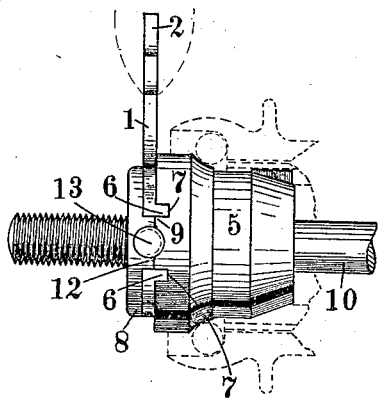
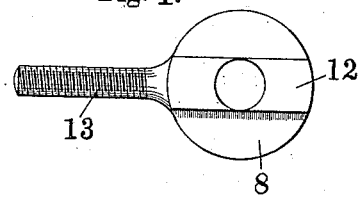
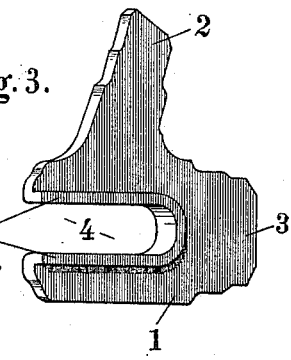
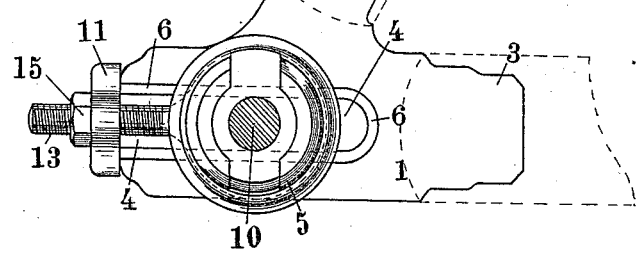
Witnesses
Inventor
Ernst Sachs
By Julian C. Dowell
Attorney

UNITED STATES PATENT OFFICE.

ERNST SACHS, OF SCHWEINFURT, GERMANY.

COASTER-BRAKE CONNECTOR.

1,045,195.        Specification of Letters Patent.       Patented Nov. 26, 1912.

Application filed January 24, 1912. Serial No. 673,219.

*To all whom it may concern:*

Be it known that I, ERNST SACHS, a subject of the King of Bavaria, residing at No. 23 Schultesstrasse, Schweinfurt, in Germany, have invented new and useful Improvements in Coaster-Brake Connectors, of which the following is a specification.

The invention relates to an improved appliance for fixing a free-wheel hub with back-pedaling brake of any construction to a cycle frame and especially to the fork end or eye provided for this purpose on the rear wheel fork.

The object of the invention is to obtain a sure engagement of the brake member to be fixed with the eye, whereby not only a relative rotation of the parts even under considerable force is effectively prevented, but the limbs of the forked eye are also rigidly fixed in position and protected from being bent inwardly or outwardly. This object is attained by providing two parallel grooves in the outer end of the brake member, corresponding to which parallel ribs or flanges project from the adjacent inner face of the eye or fork end along the longitudinal slot thereof, said flanges being adapted to engage the said grooves of the brake member, thereby locking the two members against relative rotation but allowing the adjustment of the brake member parallel with the flanges by means of the usual chain-tightening device. Owing to the said positive engagement the brake member fixes the limbs of the fork end in their operative position. The projecting part of the brake member formed by and located between the parallel grooves engages the slot of the fork end, thus further securing the connection.

Another object of the invention is to so construct the said ribs or flanges of the fork end that they are capable of resisting the pressure to which they are subjected, while the cost of manufacture of the parts is not increased. To this end the edges of the slot are bent outward at one side of the fork end, so that the flanges will present the same thickness as the body of the fork end itself.

The invention is represented by way of example in a construction illustrated in the annexed drawing, which forms a part of this specification, and in which—

Figure 1 is a side elevation showing a brake member fixed to the fork end, the whole being seen from the rear of the cycle; Fig. 2 is an elevation of the inner side of the fork end and brake member; Fig. 3 is a perspective view of the fork end; Fig. 4 is an inner side elevation of a chain-tightening device used in connection with the appliance; and Fig. 5 is an outer end view of the brake member.

Like numerals designate like parts throughout all figures of the drawing.

1 represents the eye or fork end which is secured by its arms 2 and 3 in the tubes of the rear wheel fork of the cycle frame in a known manner (as shown in dotted lines in Figs. 1 and 2), has the general shape usual in the manufacture of cycles, and is provided with a longitudinal slot 4 for receiving the wheel axle 10. The brake member 5 to be non-revolubly secured in relation to the fork end 1, consists of a cone screwed upon the axle 10 and adapted to expand a brake sleeve, partially shown in dotted lines in Fig. 1 together with part of the hub barrel. This construction, however, is not essential, as a brake member of any other desired construction, according to the particular form of brake used, may be secured in relation to and connected with the fork end 1. Upon the inner side of the fork end 1, are formed flanges or ribs 6 extending from the edges of the slot 4 toward the hub. Said flanges or ribs may easily be produced by pressing laterally part of the material to be removed in stamping out the slot 4, so as to save material.

In the end of the brake member 5 bearing against the fork end 1, are formed two parallel grooves 7, which correspond as regards position with the flanges 6 and engage the latter on their outer and inner or upper and under edges. Upon the axle 10 on the outer side of the fork end 1, is placed a disk 8 which serves as a washer for the usual nut screwed upon the axle but not shown in the drawing. A screw bolt 13 connected to the disk 8 and adapted to be adjusted by means of the usual cap 11 and a nut 15, serves as the chain-tightening means. The disk engages the slot 4 by means of a laterally projecting portion 12 from which the bolt 13 extends. This reinforcing projection 12 serves the purpose of assisting to support the two limbs of the fork. The projection 12 may be dispensed with by lengthening the projection 9 of the brake member formed between the grooves 7, so as to make it project farther into the slot 4 and extend into the main body of the fork end, in order that the pressure of the brake member will not act upon the flanges 6 alone. The improved construction of the fork end does not prevent a free wheel hub of ordinary form from being secured in the usual way between the ends of the rear wheel fork.

What I claim as my invention, and desire to secure by Letters Patent, is:

1. In an appliance for connecting a free-wheel hub with coaster brake to a cycle, the combination with a fork end having a longitudinal slot adapted to receive the wheel-axle, of flanges projecting from the edges of the slot to one side of the fork end, and a brake member formed to engage the outer faces of said flanges.

2. In an appliance for connecting a free-wheel hub with coaster brake to a cycle, the combination with a fork end having a longitudinal slot, of flanges projecting from the edges of the slot to one side of the fork end, a brake member having parallel grooves in its extremity adjacent to the fork end, which grooves are so arranged as to engage said flanges and form a projection between them which engages the slot of the fork end.

3. In an appliance for connecting a free-wheel hub with coaster brake to a cycle, the combination with a fork end having a longitudinal slot, of flanges projecting from the edges of the slot to one side of the fork end, a brake member having parallel grooves in its extremity adjacent to the fork end, which grooves are so arranged as to engage the said flanges, and a chain-tightening device having a disk located at the opposite side of the fork end and a projection extending from the said disk into the slot of the fork end.

4. In an appliance for connecting a free-wheel hub with coaster brake to a cycle, the combination with a fork-end having a longitudinal slot, of flanges projecting from the edges of the slot to one side of the fork-end, a brake member having parallel grooves in its extremity adjacent to the fork-end, which grooves are so arranged as to engage the said flanges, and a chain-tightening device having a disk located at the opposite side of the fork-end.

5. In an appliance for connecting a free-wheel hub with coaster brake to a cycle, the combination with a fork-end having a longitudinal slot, of flanges projecting from the edges of the slot to one side of the fork-end, a brake member formed to engage the outer faces of said flanges, and a chain-tightening device having a disk located at the opposite side of the fork-end.

6. In an appliance for connecting a free-wheel hub with coaster brake to a cycle, the combination with a fork-end having a longitudinal slot, of flanges projecting from the edges of the slot to one side of the fork-end, a brake member formed to engage the outer faces of said flanges, and a chain-tightening device having a disk located at the opposite side of the fork-end and a projection extending from the said disk into the slot of the fork-end.

In testimony whereof I have signed my name to this specification in the presence of two subscribing witnesses.

ERNST SACHS.

Witnesses:
RICHARD TOIGSLANDER,
RUDOLPH FRICKE.

Copies of this patent may be obtained for five cents each, by addressing the "Commissioner of Patents, Washington, D. C."